United States Patent [19]

Krause et al.

[11] 3,940,781
[45] Feb. 24, 1976

[54] CAMERA DIAPHRAGM DRIVE APPARATUS

[75] Inventors: Wolfgang Krause; Friedhelm Spanke, both of Gorlitz, Germany

[73] Assignee: Veb Pentacon Dresden, Dresden, Germany

[22] Filed: Dec. 2, 1974

[21] Appl. No.: 528,707

[30] Foreign Application Priority Data
Dec. 4, 1973  Germany............................ 175072

[52] U.S. Cl................................ 354/272; 354/266
[51] Int. Cl.² ........................................ G03B 9/02
[58] Field of Search ........... 354/270, 272, 274, 273, 354/40, 46, 47, 266, 26, 28

[56] References Cited
UNITED STATES PATENTS

| | | | |
|---|---|---|---|
| 3,186,318 | 6/1965 | Nerwin | 354/28 |
| 3,517,594 | 6/1970 | Kitai | 354/47 |
| 3,834,039 | 9/1974 | Takeuchi | 354/43 X |

*Primary Examiner*—L. T. Hix
*Assistant Examiner*—James LaBarre
*Attorney, Agent, or Firm*—William A. Drucker

[57] ABSTRACT

A diaphragm drive apparatus for an objective lens with a manually preselectable diaphragm. The diaphragm drive apparatus is provided within the objective housing and is actuable by the shutter release mechanism of the camera to which it is affixed. The apparatus includes a plunger which operates a release mechanism. This release mechanism operates a drive lever which effects a connection with a diaphragm blade drive ring. A cam follower provided on an arm of the drive lever follows a cam surface on the release mechanism. The cam surface has one portion for effecting movement of the cam follower in engagement with the cam surface and a second portion which does not impart movement to the cam follower. On operation of the release plunger by the release system in the camera, the initial movement of the release mechanism on the drive lever effects closure of the diaphragm to its manually preselected position selected on the diaphragm setting ring and on subsequent movement permits release of the camera shutter mechanism without further movement of the diaphragm.

12 Claims, 4 Drawing Figures

Fig.1

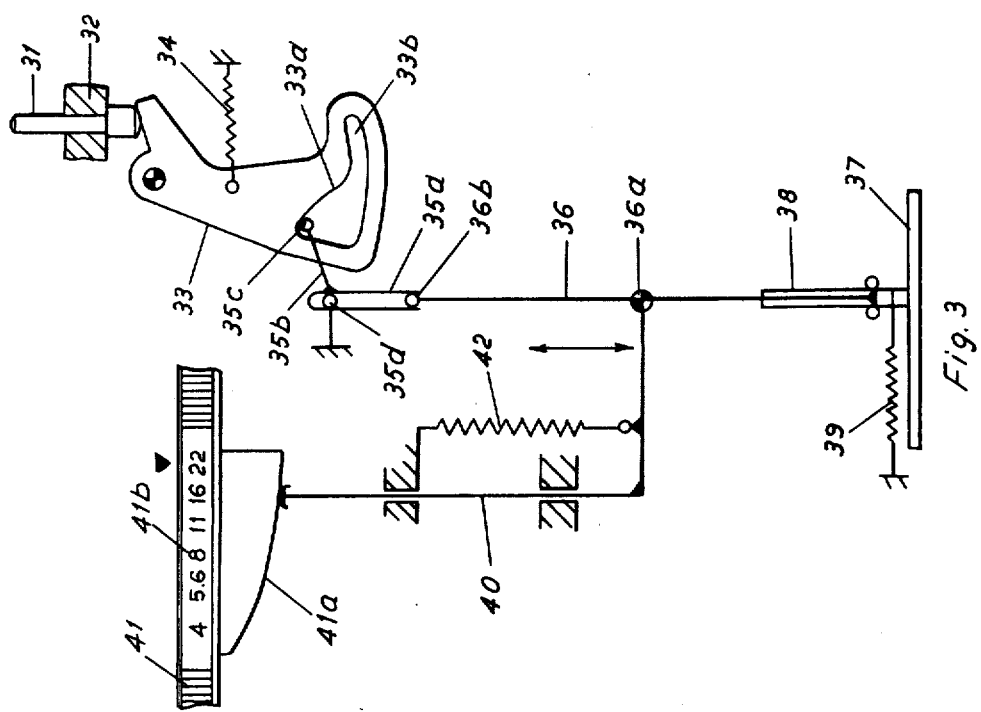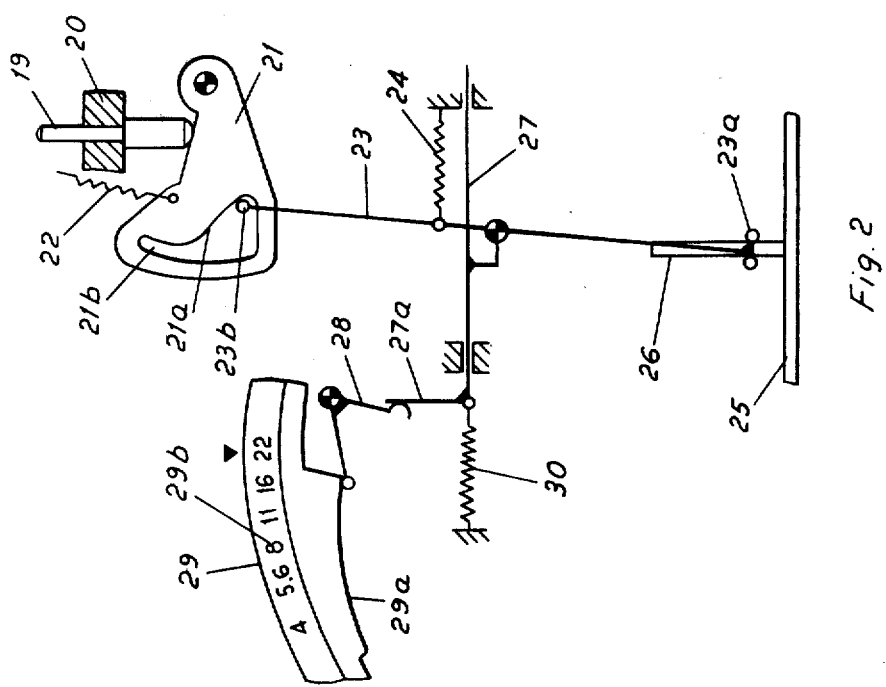

CAMERA DIAPHRAGM DRIVE APPARATUS

BACKGROUND TO THE INVENTION

The invention relates to a diaphragm drive apparatus with diaphragm preselector ring for objectives preferably of long or variable focal length, with pressure release diaphragm actuatable automatically by a plunger, where the diaphragm closure movement is transmitted through a preferably two-armed lever arm in force-engaging manner to a blade drive ring, the plunger having a surface or cam face inclined in relation to its direction of movement, with an adjoining surface without rise.

In the diaphragm actuation of objectives with automatic pressure release diaphragm, firstly during a prescribed stroke of the plunger the diaphragm closes to the preselected value, then the plunger must be capable of being pressed in further to a specific amount which is given by the shutter release point of the camera (over-stroke). Therefore in the diaphragm drive mechanism of the known objectives with automatic pressure release diaphragm, usually a spring deflector is arranged which becomes effective when the diaphragm abutment is reached.

The maximum counter-force of the spring deflector is limited by the permissible press-in force on the actuating plunger. The force of the diaphragm opening spring must be selected so great that it reliably brings the diaphragm into the open position on liberation of the plunger. The closing of the diaphragm in the case of jerky pressing in of the actuating plunger from the camera is thus effected in these known objectives by the difference between the spring force of the spring deflector and the force of the opening spring.

In an automatic preselector diaphragm having a diaphragm actuation lever rotatably mounted on a movably and spring loaded carrier, it has also already been proposed to make the rest position of this carrier adjustable, in dependence upon a control cam face arranged on the diaphragm ring, so that in the gear train between actuating plunger and diaphragm actuating lever a comparatively large idle stroke occurs which corresponds to the pivot distance, suppressed in each case by the diaphragm abutment cam, of the diaphragm actuating lever. Thus in fact the travel of the plunger which in each case is not necessary for the closing of the diaphragm is converted into an idle stroke. During the over-stroke of the actuating plunger in this case however the spring loading of the movable carrier acts as spring deflector and again diaphragm closure on jerky pressing in of the actuating plunger takes place only due to the differential force between diaphragm opening spring and spring deflector force. It is here disadvantageous that after the reaching of the preselected diaphragm aperture the actuating force rises suddenly in each case due to the response of the spring deflector.

In several other known objectives the diaphragm is held in the preselected position by a closer spring when the plunger is pressed in, and on lilberation of the plunger the diaphragm is opened against the force of the closer spring by a powerful spring arranged on the actuating plunger or on the lever driven by the latter. The closing of the diaphragm takes place thus due to the action of a closer spring. However its force must likewise be less than the permissible actuating force on the plunger, because the opening of the diaphragm is effected by the force difference of the two springs.

As regards the configuration of the plunger which effects the diaphragm closing movement either directly or through a lever linkage to the diaphragm ring, it is known that the plunger comprises a surface inclined in relation to its direction of movement or a cam face with a surface without rise adjoining this, which latter surface can serve for the idle stroke or overstroke of the plunger. The guide member for the diaphragm setting mechanism rests in force-engaging manner by means of a spring on the cam face of the plunger.

As is known, in the use of objectives with automatic pressure release diaphragm on modern cameras, specific closure time requirements are important. The diaphragm must follow the jerky press-in movement of the plunger as far as the value preselected in each case within a specific time, and the recoil phenomena caused by the diaphragm abutment must likewise have died away. These recoil phenomena are increased by the fact that the gearing part to be accelerated is halted only in force-engaging manner in its end position. Therefore observations on the closure time conditions in known objectives of long focal length always show inconsistencies on account of the larger diaphragm thereof so that diameters considerably greater masses have to be accelerated, which is problematical within the prescribed force limits. There is also the fact that on reaching of the diaphragm abutment these greater masses must be suddenly braked and thus recoil phenomena occur to a greater extent, which cannot be caused to die away sufficiently rapidly.

It is the object of the invention to provide a drive apparatus in which the available plunger press-in force is largely exploited for the closure of the diaphragm and in which at the same time recoils are largely suppressed.

SUMMARY OF THE INVENTION

The manner in which the invention solves the problem is that both the inclined surface and the adjoining surface without rise on the operating plunger or slider, or on the drive lever or on the cam cylinder, cooperate with a rivet pin or drive bolt on the diaphragm actuating lever in such a way that as well as the force-engaging movement transmission from the actuating plunger through slider or from the plunger through drive lever or from the plunger through the cam cylinder to rivet pin or drive bolt, a pin-slot or pin-grooved coupling is additionally provided, namely in force-locking manner, in the region of the surface without rise - over-stroke region. The rivet pin or drive bolt may be mounted on the diaphragm actuating lever without play, namely within a groove or slot, in the region of the over-stroke. The diaphragm is always closed by the diaphragm drive apparatus in accordance with the invention by the same amount which is determined by the length and rise of the oblique cam face on the plunger or the gearing part actuated by it, the former recoil of known arrangements of the plunger movement, especially on reaching the end position, being avoided.

In the case of objectives with long focal length along the lines of the invention it proves advantageous that a mounting part for the diaphragm actuating lever is provided which is arranged for displacement in the plane of movement of the diaphragm actuating lever, the drive bolt or rivet pin always having the same end position at the different diaphragm apertures. This displacement movement of the mounting part is controlled according to a further feature of the invention by a cam face arranged on the diaphragm preselector ring, which is preferably connected in shape-locking or force-locking manner through a bell-crank lever with the mounting part. In the case of a force-locking coupling between the cam face arranged on the diaphragm preselector ring and the bell-crank lever which drives the mounting part, it is advantageous if this force-engagement is effected by a powerful spring arranged on the displaceable mounting part which draws the mounting part and thus also the bell-crank lever in the direction in which the mounting part is displaced in the case of setting to large diaphragm apertures.

A further possibility for the shortening of the fixed drive distance on the driving lever or drive lever with the cam and guide groove is given according to the invention in that this drive lever firstly drives a non-displaceably mounted two-armed intermediate lever, the second lever arm of this intermediate lever being formed in fork shape so that the fork reaches to above a bolt of the intermediate lever and a preferably two-armed diaphragm actuating lever engages in the fork-shaped lever arm, and in that a bearing bolt is displaceable on the two-armed diaphragm actuating lever in the direction of the optical axis according to the measure of a cam face arranged on the diaphragm preselector ring. Due to this displacement of the pivot point of the drive lever its point of engagement in the fork-shaped intermediate lever is displaced and thus the closure distance of the diaphragm is limited according to the value preselected from the diaphragm ring.

So that no variation of the open diaphragm position occurs due to the displacement of the bearing point of the drive lever in the direction of the optical axis, according to the invention it is necessary that an engagement rivet is provided on the diaphragm actuating lever and the fork-shaped intermediate lever and the bearing bolts of the two levers lie in one line when the diaphragm is open, and that this connecting line extends in the direction of the optical axis.

In the case of an apparatus having a cam cylinder driven by the actuating plunger, according to the invention it is advantageous to generate the idle stroke or over-stroke due to the fact that the cam cylinder is displaceable in the direction of its axis of rotation by means of a bell-crank lever according to the measure of a control cam face arranged on the diaphragm preselector ring. The drive of the cam cylinder by the actuating plunger further expediently is effected by a rack toothing on the plunger to a pinion on the cam cylinder, through a gang wheel consisting of pinion and greater wheel.

In further development of the apparatus according to the invention, the mounting ring for the pivot rivets of the blades, which in general is fixedly arranged in the mounting part carrying the iris diaphragm, is arranged rotatably in a manner known per se about the optical axis and its rotational position is settable by means of a bell-crank lever cooperating with a cam face arranged on the diaphragm preselector ring, so that the end position of the diaphragm drive ring always remains the same at the diaphragm value preselected in each case. Thus the initial position of the diaphragm drive ring and thus also of the lever cooperating with it is likewise diaphragm-dependent and consequently when large diaphragm apertures are preselected the obliquely disposed cam face on the plunger, slider and lever strikes correspondingly later upon the diaphragm drive lever, and the diaphragm closes only to the value pre-selected in each case.

The advantages arising out of the invention are as follows:

Since in the apparatuses in accordance with the invention the closing movement of the diaphragm always is effected by rigid transmission members — that is a spring deflector is avoided — more favorable prerequisites are provided for a rapid closure of the diaphragm. Moreover the opening spring can be made relatively powerful, because in the pressing in of the plunger only this spring force and that of the relatively weak return spring have to be overcome. Diaphragm recoiling is largely suppressed, because when the plunger is pressed in, the diaphragm drive lever is always held positively in a slot.

Due to the fact that when the preselected diaphragm aperture is reached the rise of the cam face on the plunger slider or lever ceases, on the contrary a fall of the actuating force is to be noted even at the end of the plunger stroke. The more favorable force conditions and the rigid drive thus permit of equipping even objectives of longer focal length with their larger diaphragm apertures with an automatic pressure release diaphragm with springing actuation by the camera.

BRIEF DESCRIPTION OF DRAWINGS

The invention will be explained in greater detail by reference to various examples of embodiment in the drawing, wherein:

FIG. 2 shows the sketch of the principle of a diaphragm drive apparatus according to FIG. 1 in which the drive of the diaphragm drive lever takes place through a rotatably arranged drive lever, FIG. 3 shows the sketch of the principle of a diaphragm drive apparatus with a further intermediate lever and direct displacement of the pivot point of the diaphragm drive lever in the direction of the optical axis by a cam face arranged on the diaphragm preselector ring.

DESCRIPTION OF PREFERRED EMBODIMENT

The representation of all parts not necessary for the understanding of the manner of operation was omitted.

Figure 1:
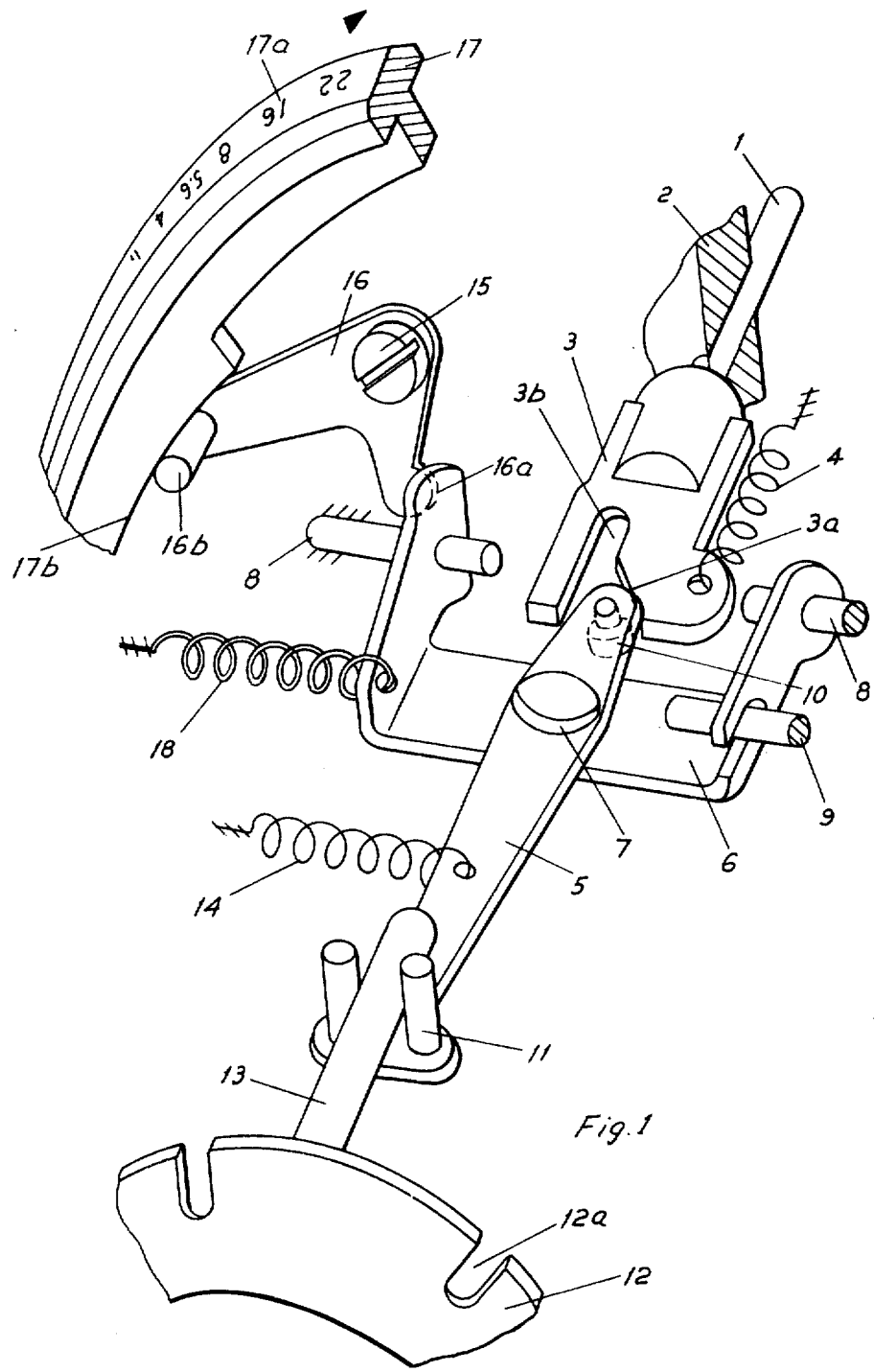
FIG. 1 shows a perspective representation of a diaphragm drive apparatus with direct drive of the diaphragm drive lever by an oblique face on the plunger.

In FIG. 1 an actuating plunger is designated by 1. It is mounted in an only fragmentarily represented part 2 connectable firmly with the camera, and is connected with a slider or plate 3. This slider 3 carries a surface or cam face 3a inclined in relation to its direction of movement, which surface or cam face merges into a slot or guide groove 3b. The plunger 1 is held in the rest position on the part 2 by a return spring 4. 5 designates a two-armed diaphragm actuating lever. It is mounted on a mounting part 6 by means of a shouldered rivet 7. The mounting part 6 is displaceably mounted on two coaxially and nondisplaceably arranged bolts 8 and is secured against rotation by a further non-displaceable bolt 9. A rivet pin 10 is seated on the diaphragm actuating lever and two further rivet pins 11 are arranged in fork form on the long lever arm of the same lever. A blade drive ring 12 is mounted in the part (not shown in the drawing) of the objective which carries the lenses and is movable for the purpose of focussing in the direction of the optical axis. The ring 12 carries slots 12a in which there engage the drive rivets of the blades (likewise not shown) which are mounted in known manner on pivot rivets in stationary bores. In the drive ring 12 there is further seated a rivet pin 13 which extends between the rivet pins 11 arranged in fork form. The lever 5 and thus also the drive ring 12 is drawn constantly in the direction of opening of the diaphragm by a spring 14.

Furthermore a bell-crank lever 16 is mounted on a non-displaceably arranged set screw 15. This lever is provided on one lever arm with a rounded nose 16a and on the other lever arm with a rivet pin 16b. A diaphragm preselector ring 17 (represented only fragmentarily) having a diaphragm scale 17a is mounted concentrically with the optical axis. It is provided with a control cam face 17b. The mounting part is pressed against the nose 16a of the bellcrank lever by a powerful spring 18 hooked to the mounting part 6, and thus the bell-crank lever 16 in turn is constantly pressed with its rivet pin 16b against the control cam face 17b.

In FIG. 2 the actuating plunger is designated by 19 and the stationary mounting part thereof is designated by 20. 21 is a likewise non-displaceably mounted drive lever. It carries a drive cam face 21a which merges into an arcuate slot or guide groove 21b concentric with its pivot point. The drive lever 21 and thus also the plunger 19 are held on a rest stop by a return spring 22. 23 is the diaphragm actuating lever with the two forked pins 23a. As in the first example of embodiment a rivet pin 23b is secured to the diaphragm actuating lever 23, so that this pin abuts in force-locking manner on the drive cam face 21a. The diaphragm actuating lever 23 is held in the open diaphragm position by the spring 24. 25 further designates a blade drive ring of the objective (not illustrated further), which ring is provided with a pin 26 for engagement in the diaphragm actuating lever 23. 27 further designates a displaceably arranged mounting part for the diaphragm actuating lever 23. The mounting part 27 is provided with an abutment edge 27a for a non-displaceably mounted bell-crank lever 28. 29 is a fragmentarily illustrated diaphragm preselector ring. It carries a control cam face 29a and a diaphragm scale 29b. The mounting part 27 is pressed against the bell-crank lever 28 and the latter against the control cam face 29a by the spring 30. For the sake of simpler and comprehensible illustration the bell-crank lever and diaphragm ring with control cam face are represented in the same plane as the other parts of the gearing. However in reality these components — as represented in perspective in FIG. 1 — are expediently arranged in two planes rotated by 90° in relation to one another.

In FIG. 3 the actuating plunger is designated by 31 and mounted in the stationary part 32. 33 is a drive lever having a drive cam face 33a which merges into a concentric slot or guide groove 33b. The drive lever 33 is held in its rest position by the spring 34. 35a and 35b designate a non-displaceably mounted two-armed intermediate lever. The lever arm 35a of the intermediate lever is of fork-shaped formation, the fork engaging over a bolt 35d. On the lever arm 35b of the intermediate lever a rivet pin 35c is secured which abuts in force-locking manner on the inclined surface 33a of the drive lever 33. 36 is a diaphragm actuating lever which is mounted on a displaceable mounting part 40 by a mounting bolt 36a. 37 is a blade drive ring of the objective (not illustrated further) having a bolt 38 which is constantly drawn by the spring 39 in the direction of diaphragm opening. Finally 41 designates a fragmentarily illustrated diaphragm preselector ring having a control cam face 41a and a diaphragm scale 41b. The mounting part 40 is forced in force-locking manner against the control cam face 41a by the action of a powerful spring 42.

Figure 4:
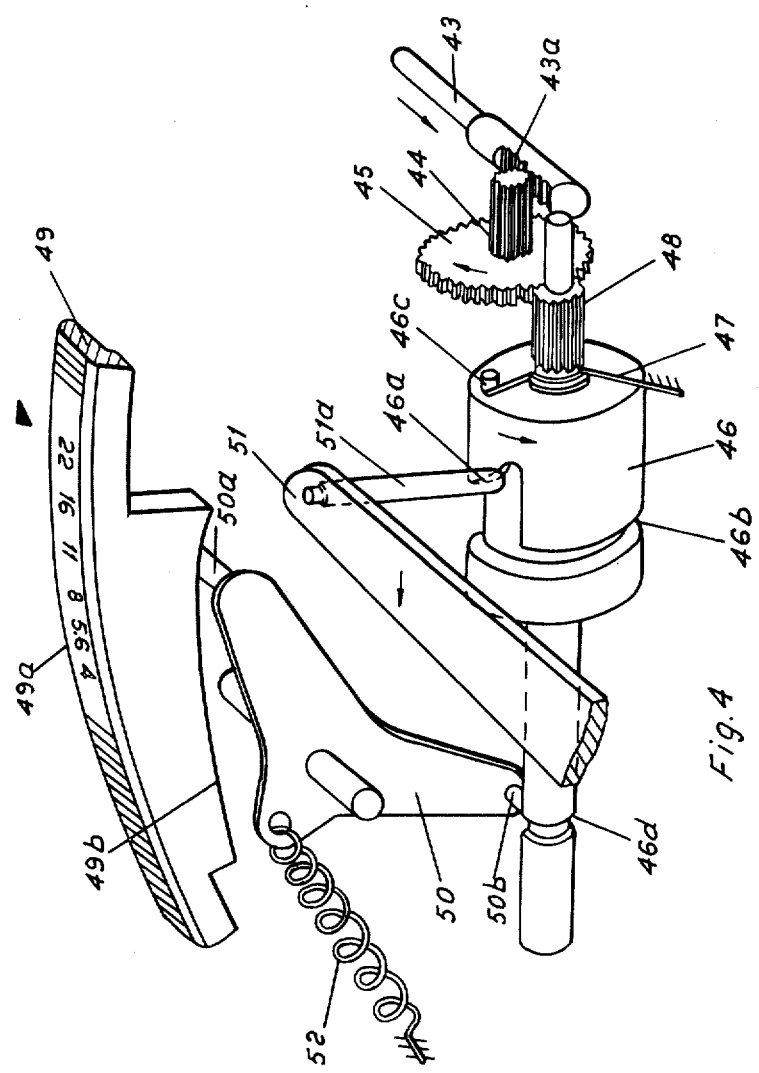
FIG. 4 shows the perspective representation of a diaphragm drive with a cam cylinder.

In FIG. 4 the actuating plunger is designated by 43. It is provided with a rack toothing 43a which cooperates with a nondisplaceably mounted pinion 44. A gear wheel 45 is arranged coaxially and firmly connected with the pinion. 46 desginates a cam cylinder mounted for displacement in the direction of its axis of rotation. It carries a cam 46a terminating in a circumferential groove 46b. 46c designates a pin. It serves as abutment for a coiled flexure spring 47. Moreover the cam cylinder is provided with a pinion toothing 48. 49 is a diaphragm preselector ring having a diaphragm scale 49a and a control cam face 49b. 50 is a non-displaceably mounted bell-crank lever having a bolt 50a for following the cam 49b and a further bolt 50b which engages in an incision 46d on the cam cylinder 46 for the displacement of the latter. 51 designates a lever arm of a non-displaceably mounted diaphragm actuating lever for an objective (not illustrated further). This arm carries a bolt 51a, which is represented exaggeratedly long for the sake of clarity. Finally 52 also designates a spring which holds the lever 50 force-lockingly on the cam face 49b.

The manner of operation of the apparatus according to FIG. 1 is as follows:-

On pressing in of the actuating plunger 1 the diaphragm actuating lever 5 is pivoted in the counter-clockwise direction by the action of the oblique surface or cam face 3a on the rivet pin 10 and thus the blade drive ring 12 is rotated in the clockwise direction by the pin 13, whereby the diaphragm blades in the objective (not illustrated) are closed. After the conclusion of this closing movement on entry of the rivet into the slot or guide groove 3b, the actuating plunger 1 can be pressed in further to the shutter release point, without variation of the diaphragm aperture. Rebounding of the blade drive ring is also largely prevented because the rivet 10 is guided in the slot 3b after the termination of the closing movement. On release of the plunger 1 the latter is returned into its rest position by the action of the spring 4 and thus the diaphragm actuating lever 5 can also return into its rest position and return the diaphragm into the open position again. On displacement of the diaphragm preselector ring 17 to larger diaphragm apertures the bell-crank lever 16 pivots with its long lever arm outwards (in the clockwise direction), thus the mounting part 6 is moved to the left by the spring 18. Due to the fact that the open diaphragm position of the blade drive ring 12 always remains the same, thus the lever 5 remains in this position between the two pins 11, the lateral displacement of the mounting part 6 consequently also draws the short lever arm of the lever 5 with the rivet 10 to the left.

Therefore on pressing in of the plunger the cam face 3a comes into engagement with the rivet 10 only later and the diaphragm — as intended — closes only to the preselected larger aperture. When the maximum diaphragm aperture is preselected the mounting part 6 is displaced so far that the rivet 10 is already situated at the level of the slot or groove 3b, so that the plunger 1 can be pressed in without action upon the lever 5. With the apparatus according to FIG. 1 the task of the invention is fulfilled with low expense. In the pressing in of the actuating plunger 1 only the very slight force of the return spring 4 has to be overcome apart from the force of the diaphragm opening spring 14. The force of the opening spring 14 can thus be relatively great and relatively great masses can be accelerated in the closing of the diaphragm by the shape-locking drive.

As regards the transmission ratio at the actuating plunger 1, the plunger travel should expediently be kept only small. The rise of the oblique surface or cam face 3a must not be selected too large, on account of the occurring friction losses. With appropriate adaptation of the lever length on the large lever arm of the lever 5 and the rivet diameter 10, inaccuracies in the controlling of the displacement distances for the diaphragm apertures and certain recoil phenomena are most extensively avoided.

The modified apparatus as represented in FIG. 2 works as follows:- On pressing in of the plunger 19 the drive lever 21 is pivoted in the counter-clockwise direction and thus the diaphragm actuating lever 23 is rotated in the counter-clockwise direction by the cam face 21a. The lever 23 entrains the diaphragm drive ring 25 by the bolt 26 between the bolts 23a and the diaphragm is closed.

When the plunger 19 is liberated again, the spring 22 pulls the lever 21 and thus also the plunger 19 back into their initial position. Thus at the same time the spring 24 moves the diaphragm actuating lever 23 and the latter again moves the blade drive ring 25 back into the open diaphragm position.

If the diaphragm ring 29 is set to larger diaphragm apertures, the bell-crank lever 28 is pivoted in the clockwise direction by the action of the control cam face 29a and the spring-loaded mounting part 27 follows this movement. Since now the open diaphragm position of the diaphragm drive ring 25 is fixed and the spring 24 always pulls the diaphragm drive ring 25 into this position by means of the lever 23, this displacement of the mounting part 27 pivots the lever 23 in the counter-clockwise direction about its point 23a of engagement in the drive ring. Thus its initial position is changed, and on pressing in of the plunger 19 the drive cam face 21a strikes later upon the lever 23 and the latter is pivoted only by a smaller amount. Thus the diaphragm closes only to the pre-selected larger aperture.

The manner of operation of the apparatus according to FIG. 3 is as follows:

On pressing in of the plunger 31 the drive lever 33 is pivoted in the clockwise direction and through the cam face 33a drives the intermediate lever 35a and 35b likewise in the clockwise direction until its drive bolt 35c is caught in the slot or guide groove 33b and thus further movement of the intermediate lever 35a and 35b is suppressed. The diaphragm actuating lever 36 is pivoted in the counter-clockwise direction by the mounting bolt 36a by the intermediate lever 35a and 35b by means of the forked lever part 35a, and in turn drives the blade drive ring 37, whereby the diaphragm (not shown) is closed to the minimum value. On liberation of the plunger 31 the drive lever 33 and thus also the plunger 31 are brought into the initial position by the return spring 34 and the blade drive ring 37 and its diaphragm-actuating lever 36 also return into the open diaphragm position by the action of the opening spring 39.

If a larger diaphragm aperture is pre-selected on the diaphragm pre-selector ring 41, then the mounting part 40 and thus also the diaphragm-actuating lever 36 are shifted towards the diaphragm pre-selector ring 41 and the engagement rivet 36b on the lever 36 in the forked part 35a of the intermediate lever 35a and 35b slides nearer to the mounting bolt 35d. The effective lever length of the lever 35a and 35b thus becomes less and consequently also generates a smaller pivoting of the diaphragm-actuating lever 36. The diaphragm (not shown further) in the objective is thus closed only less far. When the maximum diaphragm value (open diaphragm) is set on the diaphragm pre-selector ring 41, the engagement rivet 36b on the lever 36 lies in the forked lever part 35a over the mounting bolt 35d thereof. Thus the effective lever arm is zero and no closing movement takes place.

The apparatus according to FIG. 4 works as follows:

If the plunger 43 is pressed in in the direction of the arrow, by its toothing 43a it sets the pinion 44 and also the toothed wheel 45 in rotation in the direction of the arrow. The toothed wheel 45 in turn drives the cam cylinder 46 in the direction of the arrow by the pinion 48, whereby the cam 46a pivots the diaphragm-actuating lever 51 in the direction of the arrow by the bolt 51a. Thus — similarly to the case of FIG. 1 — the blade drive ring (not shown) of the objective is set in rotation and the diaphragm closes against the diaphragm-opening spring (likewise not shown) as far as is determined by the rise of the cam face 46a. During the remaining stroke of the plunger the bolt 51a is then held in the circumferential groove 46b, whereby further diaphragm movement is repressed. On liberation of the plunger 43 the cam cylinder is brought back into its initial position by the force of the spring 47, and consequently so is the plunger 43. The diaphragm (not shown) can accordingly move back again into the open position by the action of an opening spring. If a larger diaphragm aperture is pre-selected on the diaphragm ring 49, then the lever 50 — controlled by the cam face 49b — pivots in the counter-clockwise direction and shifts the cam cylinder to the right by means of the bolt 50b. Since the open diaphragm position of the lever 51 is fixed, the latter remains in the position as illustrated and on actuation of the plunger 43 the drive cam face 46a strikes upon the bolt 51a only later and the diaphragm-actuating lever 51 is pivoted by a smaller amount, whereby the diaphragm is also closed less far.

We claim:

1. In a camera with a shutter mechanism and an objective lens with preselectable diaphragm having blades therein the provision of a diaphragm drive apparatus within said objective lens and comprising:
   a. a diaphragm blade drive ring;
   b. a diaphragm preselector ring for manual preselection of the required diaphragm setting;
   c.
   d. a release mechanism operable by said release plunger;
   e. a drive lever having a cam follower provided on an arm thereof for effecting a driving connection between said release mechanism and the diaphragm blade drive ring, means for connecting said preselector ring to said drive lever for transmitting the preselected diaphragm setting to said drive lever.
   f. a cam surface on said release mechanism having one portion for effecting movement of the cam follower in engagement with said cam surface to drive said diaphragm blade drive ring and a second portion which does not impart movement to the cam follower, whereby on operation of the release plunger, the initial movement of the release mechanism on the driver lever effects closure of the diaphragm to its manually preselected position and on subsequent movement permits release of the camera shutter mechanism without further movement of the diaphragm.

2. A diaphragm drive apparatus according to claim 1, wherein said release mechanism includes an axially slideable member having formed therein said cam surface.

3. A diaphragm drive apparatus according to claim 1, wherein said release mechanism includes a pivoted plate having formed therein said cam surface.

4. A diaphragm drive apparatus according to claim 1, wherein said release mechanism includes a cam cylinder having formed thereon said cam surface.

5. A diaphragm drive apparatus according to claim 1, wherein the cam follower on the drive lever extends without play within a groove serving as the second portion of the cam surface.

6. A diaphragm drive apparatus according to claim 1, wherein said means for connecting comprises a mounting part for the drive lever, which part is arranged displaceably in the plane of movement of said drive lever, the cam follower always having the same end position relative to said cam at the different diaphragm apertures.

7. A diaphragm drive apparatus according to claim 6, wherein a cam surface provided on the diaphragm preselector ring, and a bell-crank lever providing a driving connection between the cam surface on the preselector ring and the mounting part.

8. A diaphragm drive apparatus according to claim 1, wherein the cam surface is provided on a second lever mounted for pivotal movement about a non-displaceable axis, said second lever operating the drive lever, said drive lever being formed as a two-armed intermediate lever mounted for pivotal movement about a non-displaceable axis, one arm of this drive lever being made in fork form, a two-armed diaphragm actuating lever engaging in the forked lever arm, the pivot of the two-armed diaphragm-actuating lever being displaceable in the direction of the optical axis according to the movement of a cam surface on the diaphragm preselector ring.

9. A diaphragm drive apparatus according to claim 8, wherein the diaphragm-actuating lever carries a pin which engages the fork.

10. A diaphragm drive apparatus according to claim 8, wherein the forked intermediate lever and the pivots of the intermediate lever and the drive lever lie in one line, this connecting line extending in the direction of the optical axis.

11. A diaphragm drive apparatus according to claim 4, wherein the cam cylinder is displaceable in the direction of its axis of rotation by means of a bell-crank lever according to the movement of a control cam surface arranged on the diaphragm preselector ring.

12. A diaphragm drive apparatus according to claim 4, wherein the rotation of the cam cylinder is effected by a rack on the plunger through a toothed-wheel gearing consisting of a toothed pinion, a toothed wheel and a further toothed pinion on the cam cylinder.

* * * * *